United States Patent
Kohara

(10) Patent No.: US 10,212,293 B2
(45) Date of Patent: Feb. 19, 2019

(54) INFORMATION PROCESSING DEVICE, AND SWITCHING DEVICE

(71) Applicant: Tasuku Kohara, Kanagawa (JP)

(72) Inventor: Tasuku Kohara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 17 days.

(21) Appl. No.: 15/286,247

(22) Filed: Oct. 5, 2016

(65) Prior Publication Data

US 2017/0097719 A1 Apr. 6, 2017

(30) Foreign Application Priority Data

Oct. 5, 2015 (JP) .................................. 2015-197365
May 27, 2016 (JP) .................................. 2016-106069

(51) Int. Cl.
| | |
|---|---|
| *H04N 1/00* | (2006.01) |
| *G06F 3/14* | (2006.01) |
| *G06F 3/039* | (2013.01) |
| *G09G 5/00* | (2006.01) |

(52) U.S. Cl.
CPC ......... *H04N 1/00411* (2013.01); *G06F 3/039* (2013.01); *G06F 3/14* (2013.01); *G09G 5/00* (2013.01); *G09G 2340/04* (2013.01); *H04N 2201/0089* (2013.01); *H04N 2201/0094* (2013.01)

(58) Field of Classification Search
CPC ...... G06F 3/016; G06F 3/0227; G06F 3/0412; G06F 3/0416; G06F 3/044; G06F 3/14
See application file for complete search history.

(56) References Cited

U.S. PATENT DOCUMENTS

| | | | | |
|---|---|---|---|---|
| 5,601,489 A | * | 2/1997 | Komaki | G06F 3/0238 235/146 |
| 6,492,978 B1 | * | 12/2002 | Selig | G06F 3/04886 345/168 |
| 6,776,546 B2 | * | 8/2004 | Kraus | B41J 5/102 400/472 |
| 7,068,499 B2 | * | 6/2006 | Aisenberg | G06F 1/1616 345/158 |
| 7,176,898 B2 | * | 2/2007 | Litwiller | G06F 3/011 341/21 |

(Continued)

FOREIGN PATENT DOCUMENTS

| | | |
|---|---|---|
| JP | 4478436 | 6/2005 |
| JP | 2006-323457 | 11/2006 |

(Continued)

*Primary Examiner* — Michael J Jansen, II

(74) *Attorney, Agent, or Firm* — Oblon, McClelland, Maier & Neustadt, L.L.P.

(57) ABSTRACT

An information processing device includes a touchscreen that includes a first surface that outputs images and detects an input to the first surface, a sensor that detects whether a switching device is mounted an the touchscreen, and processing circuitry. The processing circuitry is configured to control a display state of the touchscreen based on a detection result of the sensor so that the touchscreen outputs in a first display mode when the switching device is not mounted on the touchscreen, and the touchscreen outputs in a second display mode when the switching device is mounted on the touchscreen.

18 Claims, 9 Drawing Sheets

(56) References Cited

U.S. PATENT DOCUMENTS

| | | | | |
|---|---|---|---|---|
| 7,221,330 | B2* | 5/2007 | Finke-Anlauff | G06F 1/1616 345/1.1 |
| 7,388,578 | B2* | 6/2008 | Tao | G06F 1/1624 345/158 |
| 7,659,885 | B2* | 2/2010 | Kraus | B41J 5/102 345/168 |
| 7,667,685 | B2* | 2/2010 | Yamada | G03G 15/5016 345/156 |
| 8,033,515 | B2* | 10/2011 | Martin | G06F 1/1607 248/224.61 |
| 8,081,340 | B2* | 12/2011 | Lapstun | B41J 3/445 358/1.15 |
| 8,085,242 | B2* | 12/2011 | Endoh | G03G 15/502 345/156 |
| 8,184,103 | B2* | 5/2012 | Masuda | H04M 1/0237 345/173 |
| 8,310,351 | B2* | 11/2012 | Krahenbuhl | G06F 1/1626 340/407.2 |
| 8,339,358 | B2* | 12/2012 | Kohara | G03G 15/5016 345/156 |
| 8,558,796 | B2* | 10/2013 | Giancarlo | G06F 1/1662 345/168 |
| 8,780,364 | B2* | 7/2014 | Kohara | G03G 15/5016 358/1.12 |
| 8,941,614 | B2* | 1/2015 | Tseng | G06F 1/16 345/173 |
| 8,988,355 | B2* | 3/2015 | Solomon | G06F 1/1662 345/168 |
| 8,994,699 | B2* | 3/2015 | Jung | G06F 3/03545 345/173 |
| 9,285,837 | B2* | 3/2016 | Meierling | G06F 1/1662 |
| 9,690,333 | B2* | 6/2017 | Liang | G06F 1/1681 |
| 10,042,442 | B2* | 8/2018 | Kwak | G06F 1/1669 |
| 10,042,480 | B2* | 8/2018 | Krahenbuhl | G06F 1/1626 |
| 2003/0235452 | A1* | 12/2003 | Kraus | B41J 5/102 400/472 |
| 2004/0061677 | A1* | 4/2004 | Hejza Litwiller | G06F 3/011 345/156 |
| 2004/0108968 | A1* | 6/2004 | Finke-Anlauff | G06F 1/1616 345/1.1 |
| 2004/0233624 | A1* | 11/2004 | Aisenberg | G06F 1/1616 361/679.56 |
| 2004/0248621 | A1* | 12/2004 | Schon | G06F 1/1616 455/566 |
| 2005/0099403 | A1* | 5/2005 | Kraus | B41J 5/102 345/173 |
| 2006/0005131 | A1* | 1/2006 | Tao | G06F 1/1624 715/702 |
| 2006/0256090 | A1* | 11/2006 | Huppi | A63F 13/02 345/173 |
| 2007/0138360 | A1* | 6/2007 | Martin | G06F 1/1607 248/223.41 |
| 2007/0146334 | A1 | 6/2007 | Inokawa | |
| 2008/0120559 | A1* | 5/2008 | Yee | G06F 1/1613 715/764 |
| 2009/0066644 | A1* | 3/2009 | Endoh | G03G 15/5016 345/157 |
| 2009/0104936 | A1* | 4/2009 | Lapstun | B41J 3/445 455/556.1 |
| 2009/0201527 | A1* | 8/2009 | Yamada | G03G 15/5016 358/1.15 |
| 2009/0244022 | A1* | 10/2009 | Masuda | H04M 1/0237 345/173 |
| 2009/0316193 | A1 | 12/2009 | Kohara et al. | |
| 2009/0316954 | A1* | 12/2009 | Kohara | G03G 15/5016 382/103 |
| 2010/0302168 | A1* | 12/2010 | Giancarlo | G06F 1/1662 345/169 |
| 2011/0241999 | A1* | 10/2011 | Thier | G06F 3/023 345/168 |
| 2011/0248838 | A1* | 10/2011 | Krahenbuhl | G06F 1/1626 340/407.2 |
| 2011/0248947 | A1* | 10/2011 | Krahenbuhl | G06F 1/1626 345/174 |
| 2011/0267274 | A1* | 11/2011 | Shusteri | G06F 3/0219 345/168 |
| 2012/0050165 | A1* | 3/2012 | Kim | G06F 3/04886 345/168 |
| 2012/0075125 | A1* | 3/2012 | Miwa | G06F 1/1669 341/22 |
| 2012/0200874 | A1* | 8/2012 | Kohara | G03G 15/5016 358/1.12 |
| 2012/0274566 | A1* | 11/2012 | Tran | G06F 1/1654 345/168 |
| 2013/0127793 | A1* | 5/2013 | Jung | G06F 3/03545 345/179 |
| 2013/0249808 | A1* | 9/2013 | Silk | G06F 3/039 345/173 |
| 2013/0314731 | A1 | 11/2013 | Omi et al. | |
| 2013/0335327 | A1* | 12/2013 | Solomon | G06F 1/1662 345/168 |
| 2013/0335364 | A1* | 12/2013 | Tseng | G06F 1/16 345/174 |
| 2014/0022174 | A1* | 1/2014 | Chen | G06F 3/044 345/168 |
| 2014/0055363 | A1* | 2/2014 | Meierling | G06F 1/1662 345/169 |
| 2015/0338889 | A1* | 11/2015 | Liang | G06F 1/1632 361/679.29 |
| 2016/0189328 | A1* | 6/2016 | Vranjes | G06F 3/0488 345/173 |
| 2016/0252932 | A1* | 9/2016 | Seo | G06F 1/1626 345/173 |
| 2016/0320810 | A1* | 11/2016 | Kim | G06F 1/1669 |
| 2017/0083109 | A1* | 3/2017 | Li | G06F 3/04886 |
| 2017/0168593 | A1* | 6/2017 | Kwak | G06F 1/1669 |
| 2017/0329517 | A1* | 11/2017 | Li | G06F 3/04886 |
| 2018/0188822 | A1* | 7/2018 | Kim | G06F 3/044 |

FOREIGN PATENT DOCUMENTS

| | | |
|---|---|---|
| JP | 2010-049316 | 3/2010 |
| JP | 2012-088919 | 5/2012 |
| JP | 2013-532867 | 8/2013 |
| JP | 2014-232911 | 12/2014 |

\* cited by examiner

FIG. 11

| | THE STATE OF PIN | LCD DISPLAY | SOFTWARE KEY POSITION |
|---|---|---|---|
| HARDWARE KEY A (SMALL) | 207 : ON / 208 : OFF | VERTICAL SCREEN DISPLAY | VERTICAL SCREEN SUPPORT |
| HARDWARE KEY A (LARGE) | 207 : OFF / 208 : ON | HORIZONTAL SCREEN DISPLAY | HORIZONTAL SCREEN SUPPORT |
| HARDWARE KEY NONE | 207 : OFF / 208 : OFF | BASIC SCREEN | BASIC SCREEN |

INFORMATION PROCESSING DEVICE, AND SWITCHING DEVICE

CROSS-REFERENCE TO RELATED APPLICATIONS

This application is based on and chums the benefit of priority to Japanese Application No. 2015-197365, filed in Japan on Oct. 5, 2015, and to Japanese Application No. 2016-1060169, filed in Japan on May 27, 2016, the disclosure of each of which is hereby incorporated by reference in their entirety.

BACKGROUND OF THE INVENTION

The present invention relates to an information processing device, and more specifically to an information processing device, switching device and method for controlling a display output for a touchscreen when a switching device is mounted upon the touchscreen.

DESCRIPTION OF THE RELATED ART

In recent years, information processing devices have become important equipment for the scanning of documents and the physical output of digital information. Such devices may include multi-function peripheral (MFP) devices that function as a printer, a facsimile, and a copier by providing an imaging function, an image forming function, and communication function.

Such devices may further include a display, such as a liquid crystal display (LCD). Further, the display may have touch panel capabilities to further function as an operating part. At the operating part of the touch panel type, software keys are output onto the LCD screen, and various processing are executed by the device when the software keys are operated by a user.

In an input operation by a user, it is possible for the user to directly operate a software key by pressing the software key displayed on the display. However, when the user presses the software key, the user to does receive any physical feedback, i.e. there is no physical repulsion such as when the user depresses a hardware key or mechanical key. That is, when operating a touch panel of a capacitance sensing type, the touch panel detects a positional information of the place that receives a depressive force at the time when the user presses the software key.

Accordingly, it is contemplated that a user may operate a device by arranging a hardware mechanical key as an alternative to the touch panel. Therefore, this application considers the limitations of the conventional art described above.

SUMMARY

The present disclosure provides an information processing device, switching device and method by an input may be provided to a touchscreen via a switching device mounted upon the touchscreen.

In accordance with the present disclosure, an information processing device comprises a touchscreen that includes a first surface that outputs images and detects an input to the first surface, a sensor that detects whether a switching device is mounted on the touchscreen, and processing circuitry. The processing circuitry is configured to control a display state of the touchscreen based on a detection result of the sensor so that the touchscreen outputs in a first display mode when the switching device is not mounted on the touchscreen, and the touchscreen outputs in a second display mode when the switching device is mounted on the touchscreen.

The processing circuitry controls the touchscreen so that, when outputting in the second display mode, the output images are formatted according to an arrangement of a plurality of switches on the switching device and a position of the switching device on the touchscreen. The switching device may include an identifier, and the sensor may detect whether the switching device is mounted on the touchscreen according to whether the sensor recognizes the identifier.

The switching device includes a plurality of identifiers so that, when the sensor detects that the switching device is mounted on the touchscreen, the sensor also detects an orientation of the switching device by recognizing respective positions of the plurality of identifiers, and the processing circuitry recognizes the orientation of the switching device based on the orientation detected by the sensor, and formats the output images according to the orientation of the switching device.

The sensor detects a placement error of the switching upon the touchscreen, and the processing circuitry controls the touchscreen to output the images to indicate the placement error. The switching device outputs an electrostatic charge to the first surface of the touchscreen in response to each depression of a plurality of the switches of the switching device, and the touchscreen detects the electrostatic charge, output by the switching device, as the input.

The switching device outputs a mechanical force to the first surface of the touchscreen in response to each depression of a plurality of the switches of the switching device, and the touchscreen detects the mechanical force, output by the switching device, as the input.

In accordance with the present disclosure, when in the first display mode, the touch screen outputs the images in a first area encompassing the first surface, when in the second display mode and the touchscreen is mounted on a portion of the first surface, the touch screen outputs the images in a second area of the first surface, and the second area being smaller than the first area being adjacent to the portion of the first surface in which the switching device is mounted. Further, when in the second display mode, the second area is larger when the touchscreen is mounted in a portrait orientation than when the touchscreen is mounted in a landscape orientation.

In accordance with the present disclosure, a switching device comprises a mechanically depressible switch, and a pin configured for mounting the switching device onto a touchscreen of an information processing device, wherein the switching device outputs a detectable change to the touchscreen in response to each depression of the mechanically depressible switch.

A method in accordance with the present disclosure comprises detecting, by a sensor of an information processing device, whether a switching device is mounted onto a touchscreen of the information processing device, controlling, by processing circuitry of the information processing device when a detection result of the sensor indicates that the switching device is not mounted on the touchscreen, the touchscreen to output images in a first display mode, and controlling, by the processing circuitry when the detection result of the sensor indicates that the switching device is mounted on the touchscreen, the touchscreen to output the images in a second display mode.

BRIEF DESCRIPTION OF THE DRAWINGS

The accompanying drawings are included to provide further understanding of the present application, and are incorporated in and constitute a part of this specification. The drawings, together with the specification, serve to explain the principle of the present application.

FIG. 11 illustrates an example of a data table to be referred at which the information processing device controls the screen displayed on the display panel according to the present disclosure.

DETAILED DESCRIPTION

In the following discussion, exemplary implementations are described in detail with reference to the accompanying drawings so as to facilitate the understanding of the disclosure. However, the disclosure of this patent specification is not intended to be limited to the specific terminology so selected, and it is to be understood that each specific element includes all technical equivalents that operate in a similar manner and achieve a similar result.

Figure 1:
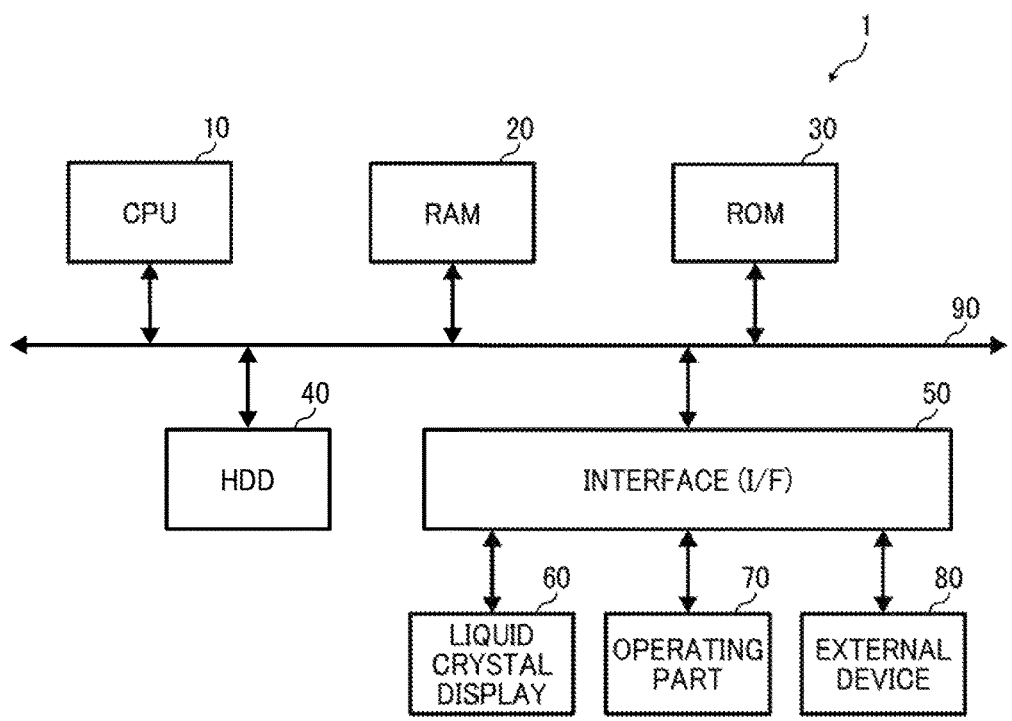
FIG. 1 illustrates a hardware block diagram of an information processing device according to the present disclosure.

In accordance with this disclosure, an image forming apparatus, which may also be referred to as an information processing device includes a touch panel or a key board as an interface for performing an operation input by a user. FIG. 1 illustrates a hardware block diagram of an information processing device according to the present disclosure. As shown in FIG. 1, image processing device 1 may include a CPU (Central Processing Unit) 10, RAM (Random Access Memory) 20, ROM (Read Only Memory) 30, HDD (Hard Disk Drive) 40, and an interface (I/F) 50 is connected to each other via a bus 90. Also, the interface (I/F) 50 is connected to an LCD (Liquid Crystal Display) 60, an operating pan 70, and an external device 80.

In an exemplary implementation, CPU 10, in conjunction with any of RAM 20, ROM 30 and HDD 40, may be a general or specific-purpose processor, a digital signal processor (DSP), an ASIC, a field programmable gate array (FPGA) or other programmable logic device (PLD), a discrete gate or transistor logic, discrete hardware components or any other combination for executing functions to realize logic blocks. CPU 10 may include modules, parts, circuits and or integrated circuits, all of which may be referred to as processing circuitry. The processing circuitry may include a general-purpose processor, and the processing circuitry may include any number of processors, controllers, micro-controllers or state machines. The processing circuitry can also be a combination of computer equipment, such as a combination of a DSP and a micro-processor, a combination of plural micro-processors, or a combination of a DSP and plural micro-processors.

The processing circuitry of image processing device 1 may separately or jointly implement each of functionality of the components illustrated in FIG. 2, which will be discussed later. Moreover, executable instructions performed by the processing circuitry of image processing device 1 may be stored in a non-transitory computer-readable medium. The non-transitory computer-readable medium can be any real medium that can be accessible by the processing circuitry. Such a non-transitory computer-readable medium may include RAM 20, ROM 30, HDD 40, an EEPROM, or other static/dynamic memory or media.

CPU 10 is control a whole of the image processing device 1. RAM 20 is a volatile recording media available to read or write data fast, is used for a work area of CPU 10. ROM 30 is a non-volatile read-only memory in which is stored programs as a firmware. HDD 40 is a non-volatile recording media available to read or write data in which are stored OS (Operating System), various control programs, and application programs (referred to later, the application) etc. RAM 20, ROM 30, and HDD 40 may be hereinafter referred to as "memory".

The I/F 50 connects bus 90 and various hardware or network. The LCD 60 is a visual user interface for confirming a status of the information processing device 1 by the user. The operating part 70 is a user interface for inputting information into the image forming apparatus by the user. LCD 60 and operating part 70 may be configured to function as a touch panel in which the touch panel outputs display images and receives a touch input by a user. Further, operating part 70 may be configured so that a hardware key or switching device is mounted upon operating part 70.

The external device 80 is hardware for realizing a specific function of the information processing device 1, such as a print engine that executes an image forming output on a paper, and a scanner that reads image on a paper.

Figure 2:
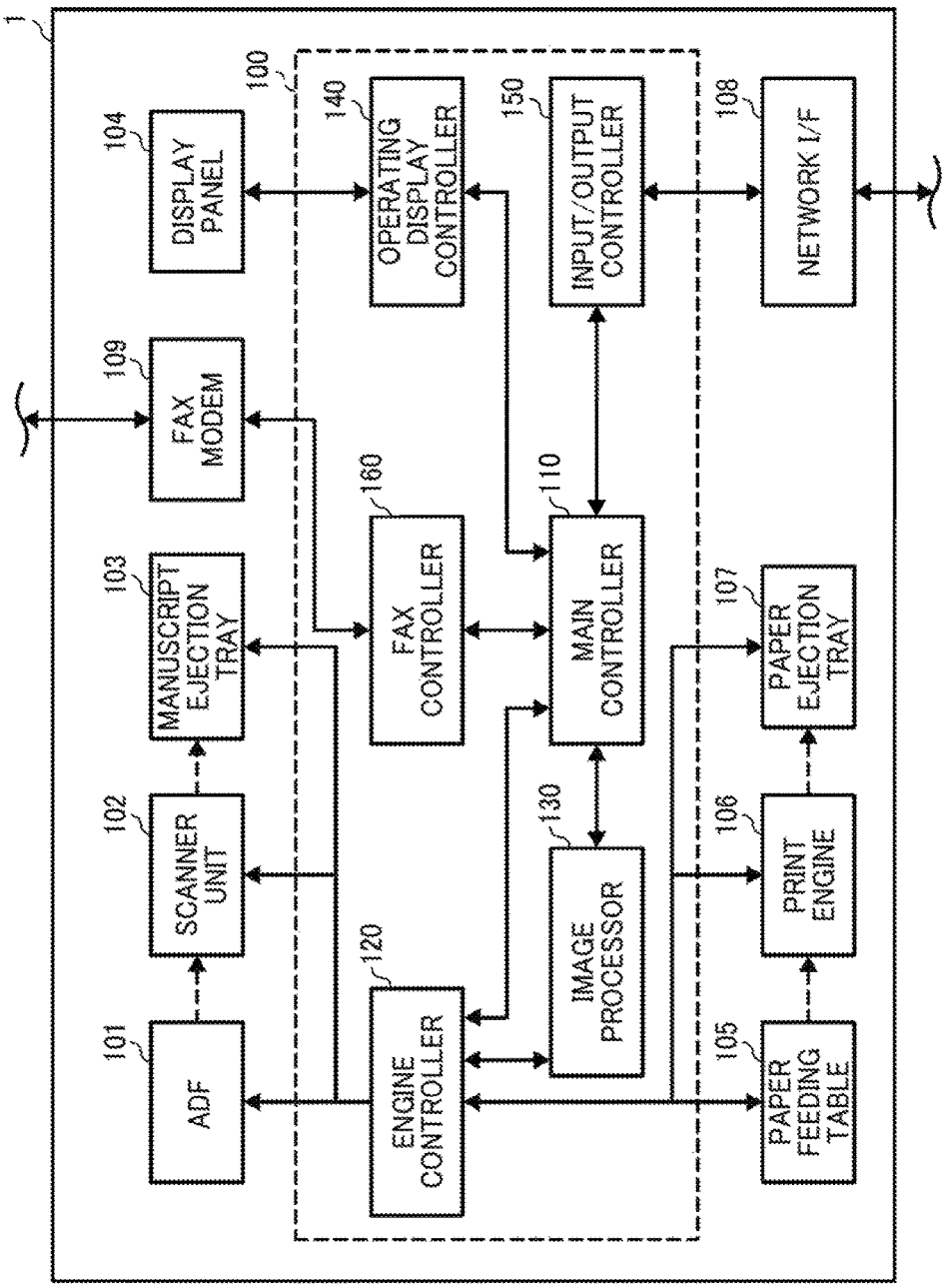
FIG. 2 illustrates a further configuration of the information processing device according to the present disclosure.

FIG. 2 illustrates a further configuration of the information processing device according to the present disclosure. As shown in FIG. 2, the information processing device 1 includes a controller 100, ADF (Auto Document Feeder) 101, a scanner unit 102, a manuscript ejection tray 103, a display panel 104, a paper feeding table 105, a printer engine 106, a paper ejection tray 107, and network interface (hereinafter referred to as "I/F") 108.

Controller 100 includes a main controller 110, an engine controller 120, an image processor 130, an operating display controller 140 and input/output controller 150. In an exemplary implementation, the functionality of controller 100 is performed by the processing circuitry, as described above. As shown in FIG. 2, the information processing device 1 related to the embodiment is configured as a MFP (Multi-Function Peripheral) device that may include a scanner unit 102, and a printer engine 106. Further, FIG. 2 includes continuous arrows that show electrical connections, and dashed arrows that show streams of sheets.

In an exemplary implementation, the display panel 104 is a touchscreen that displays the status of the information processing device, and receives a touch input, for example from a user. That is to say, the display panel 104 may display an image to accept an operation by the user. The display panel 104 may be realized by the LCD 60 and the operating part 70. In other words, the display panel 104 may function as an operating display part. As will be discussed below with respect to FIG. 4C, the display panel 104 may include LCD 60 and operating part 70, and may further include a cover glass 74, a capacitor sensor 72, a cable 61, a display panel controller 62, and mounting sensors 63 and/or 64.

The network I/F 108 is an interface in which the information processing device 1 communicates with an external device via a network. The interface is used for the Ethernet or a USB (Universal Serial Bus) interface. The network I/F 108 may communicate by the TCP/IP protocol. The network I/F 108 performs as an interface for executing a facsimile transmission when the information processing device 1 performs as a facsimile. For the reason, the network I/F 108 may be connected to a telephone line. The network I/F 108 is realized by an I/F 50.

The functionality of controller 100 is executed by the processing circuitry, such as CPU 10. Main controller 110 controls each part which is included in the controller 100, and gives instructions to the each part of the controller 100. Main controller 110 may be executed by CPU 10. The engine controller 120 plays a role as a drive part which controls or drives the printer engine 106, the scanner unit 102 etc. The image processor 130 generates drawing information based on the image information to be printed in accordance with the control of the main controller 110. The drawing information is the information which the printer engine 106, and the image forming part draws the information to be formed in an image forming operation.

The image processor 130 receives the imaging data from the scanner unit 102 and generates an image data. The image data is information which is stored into a memory of the information processing device 1 as a result of the scanner operation, or is transmitted to other information processing terminal or memories via the network I/F 108.

The operating display controller 140 controls the display panel 104 to display information or notifies the main controller 110 of information which is input via the display panel 104. The input/output controller 150 inputs information into the main controller 110 which is input via the network I/F 108. The main controller 110 controls the input/output controller 150, and accesses at least one other devices via the network I/F 108 and the network.

The operating display controller 140 refers to placement information, stored in HDD 40, and controls the display panel 104 to display images according to the placement information. For example, the placement information may represent a layout or configuration in which the images are to be positioned when output upon display panel 104.

In the case of the information processing device 1 acts as a printer, at first, the input/output controller 150 receives a print-job via the network I/F 108. The input/output controller 150 transfers the received print-job to the main controller 110. The main controller 110 generates drawing information by controlling the image processor 130 based on the document information included in the print-job or the image information, when the main controller 110 receives the print-job.

When the drawing information is generated by the image processor 130, the engine controller 120 transfers images onto papers that are conveyed from the paper feeding table 105, based on the generated drawing information. In other words, the image processor 130, the engine controller 120, and the printer engine 106 act as an image forming output part. The specific aspects of the printer engine 106, it is able to use the image forming mechanism by an ink jet method or an electro-photographic method. The document which is formed by the printer engine 106 is ejected to the paper ejecting tray 107.

In the case of the information processing device 1 acts as a scanner, the operating display controller 140 or the input/output controller 150 transmits a scan execution signal to the main controller 110 in response to an execution instruction which is input from other terminal via the operation of the display panel 104 by a user or the network I/F 108. The main controller 110 controls the engine controller 120 based on the execution signal. Similarly, when the information processing device 1 acts as a facsimile, the FAX controller 160 of the controller 100 and the FAX modem 109 operate in conjunction.

The engine controller 120 drives the ADF 101 and conveys an imaging target manuscript which is set into the ADF 101 to the scanner unit 102. And the engine controller 120 drives the scanner unit 102 and images the manuscript which is conveyed from the ADF 101. Also, in the case of the manuscript which is set into the scanner unit 102 directly is not set into the ADF 101, the scanner unit 102 images the manuscript in accordance with the control of the engine controller 120. In other words, the scanner unit 102 acts as an imaging part, the engine controller 120 acts as a reading control part.

In an operation of imaging, an imaging element, a CIS (Contact Image Sensor) which is included in the scanner unit 102, or CCD (Charge Coupled Device), etc. scans the manuscript optically, an imaging information is generated based on an optical information. The engine controller 120 transmits the imaging information generated by the scanner unit 102 to the image processor 130. The image processor 130 generates the image information based on the imaging information which is received from the engine controller 120 in accordance with the main controller 110.

The main controller 110 obtains the imaging information which is generated by the image processor 130, and the main controller 110 stores the imaging information into a memory media, the HDD 40 which is mounted on the information processing device 1. In other words, the scanner unit 102, the engine controller 120, and the image processor 130 act as an image input part in conjunction. The image information which is generated by the image processor 130 is stored into the HDD 40 in response to the user's instruction, or is transferred to the external device via the input/output controller 150 and the network I/F 108.

Also, in the case of the information processing device 1 acts as a copier machine, the image processor 130 generates drawing information based on the imaging information which is received by the engine controller 120 from the scanner unit 102, or the image information which is generated by the image processor 130. The engine controller 120 drives the printer engine 106 base on the drawing information alike in the case of the printer action. It should be noted, in the case of an information format between the drawing information and the imaging information, the imaging information is able to be used as the drawing information.

Figure 3:
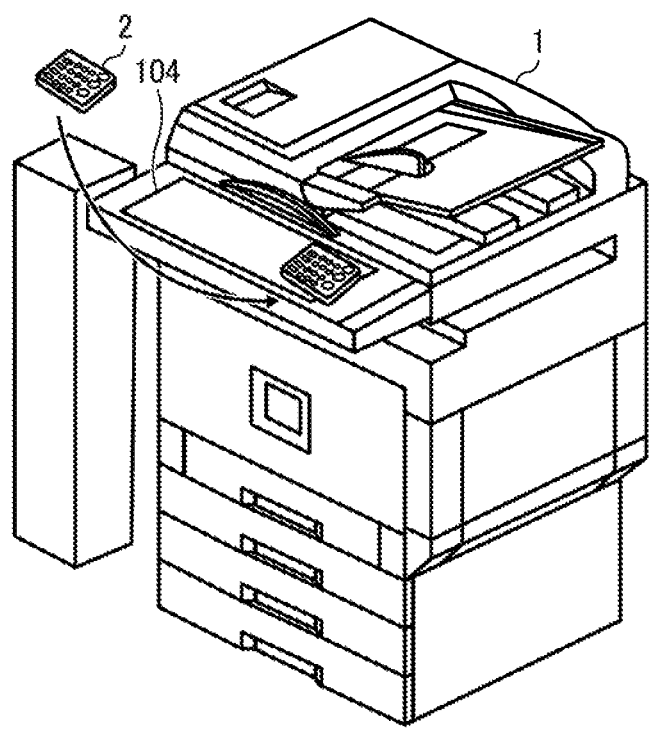
FIG. 3 illustrates the information processing device and a hardware key according to the present disclosure.

In an exemplary implementation of the information processing device, the information processing device is further configured to receive an input via a switching device that is mounted onto the display panel, as shown in FIG. 3. In particular, FIG. 3 illustrates the information processing device and a hardware key according to the present disclosure. As illustrated in FIG. 3, hardware key 2, a switching device, may be mounted onto the display panel 104.

Figure 4A:
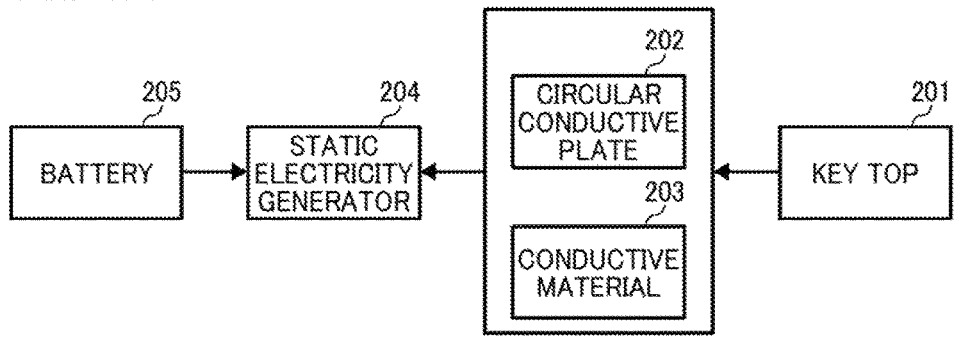
FIG. 4A illustrates a component configuration of a switching device according to the present disclosure.
Figure 4B:
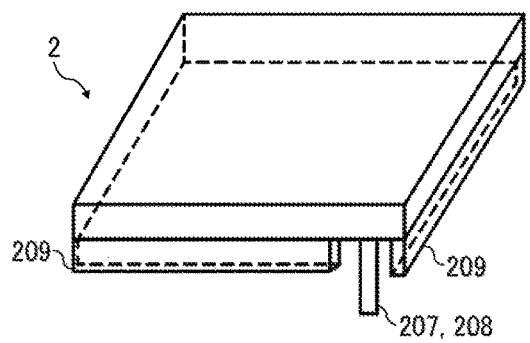
FIG. 4B illustrates a structural configuration of the switching device according to the present disclosure.
Figure 4C:
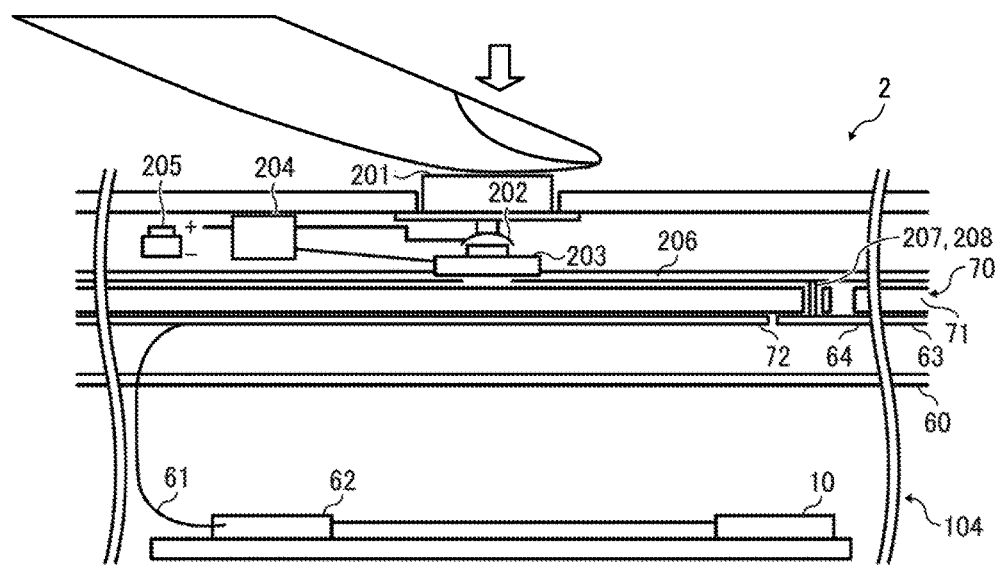
FIG. 4C illustrates the switching device mounted upon the information processing device according to the present disclosure.

FIG. 4A illustrates a component configuration of a switching device according to the present disclosure. As shown in FIG. 4A, a switching device, identified as the hardware key 2, includes a key top 201, a circular conductive plate 202, a conductive material 203, a static electricity generator 204, a battery 205, conductive cover 206. Hardware key 2 may further include an identifier.

As shown in FIG. 4A, when the key top 201 is depressed by a user operation, the circular conductive plate 202 and the conductive material 203 contact each other, and a weak static electric charge is output by the static electricity generator 204 and the battery 205. And therefore, the hardware key 2 acts as a switching device that generates static electricity by the depressing operation. The static electricity which is generated at this time is energized to the operating part 70 via a drill opened hole opposed to a surface to the display panel 104 at the conductive cover 206. The capacitance is changed when the static electricity is energized to the cover glass 71. The capacitor sensor 72, which is arranged to the bottom surface of the cover glass 71, detects the static electric change and capacitor sensor 72 recognizes that the software keys which are arranged to the operating panel 70 is manipulated.

When the user of the information processing device 1 depresses the key top 201, the user is able to feel and/or receive a physical repulsion, i.e. a mechanical force, and the hardware key 2 is depressed. Further, a static electricity generating mechanism in the present disclosure at the hardware key 2 may function via a piezoelectric. Even with such a configuration, the user is able to recognize the physical repulsion from the key top 201 because the shape of the circular conductive plate 202 changes when the key top 201 is depressed by the user's operation.

The static electricity sensor 72 includes and/or is connect to a conductive film, and static electricity sensor 72 detects the change of the capacitance generated by the user's touch operation on the display panel 104. Further, static electricity sensor 72 specifies the coordinate of the position at which the tonal operation is performed. And therefore, capacitor sensor 12 detects the static electricity which is energized from the hardware key 2, and detects a position in which the operating part 70 is manipulated.

It should be noted, in the case of the hardware key 2 includes a plurality of key top 201, it is conceivable that the position at which of the hardware key 2 is mounted on the display panel 104 may be different. Depending on the position at which the hardware key 2 is mounted, the coordinate detected according to the static electricity generated by depressing the key top 201 changes and, as a result, an intended operation could be input by mistake.

Thus, the mounting sensors 63 and/or 64 detect the identifier of hardware key 2, and detect the position where the hardware key 2 is mounted onto the display panel 104 based an the detection result.

Figure 5:
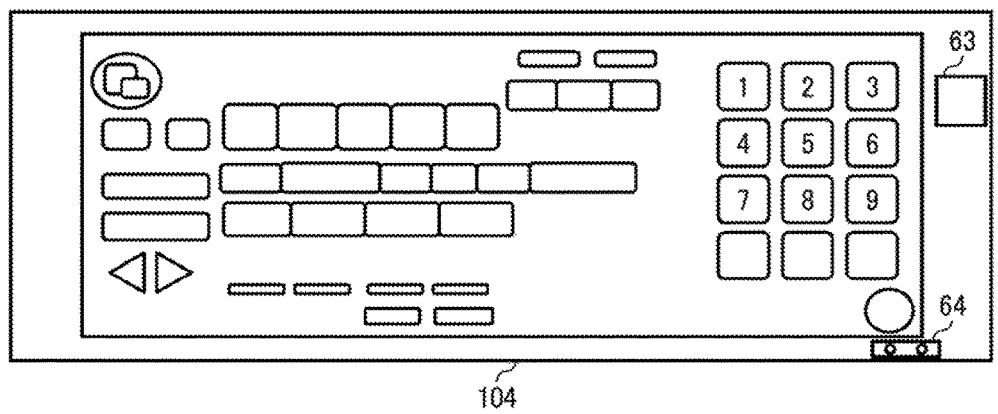
FIG. 5 illustrates an exemplary screen displayed on an operating part according to the present disclosure.
Figure 6:
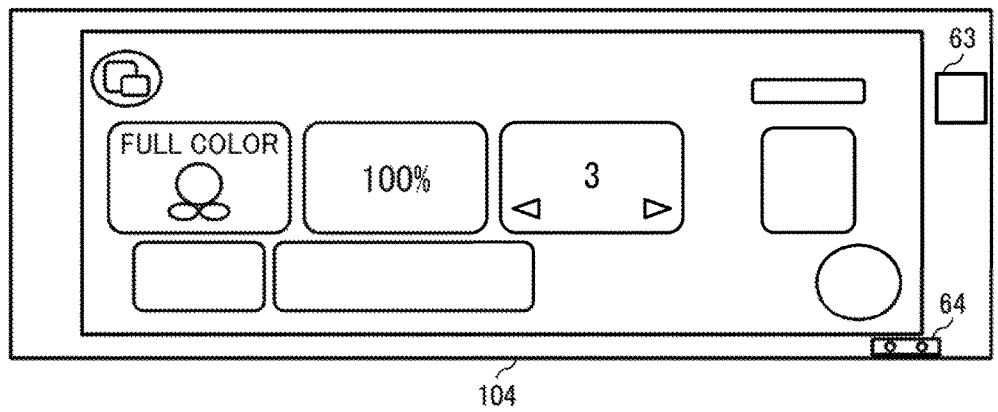
FIG. 6 illustrates an exemplary screen displayed on the operating part according to the present disclosure.
Figure 7:
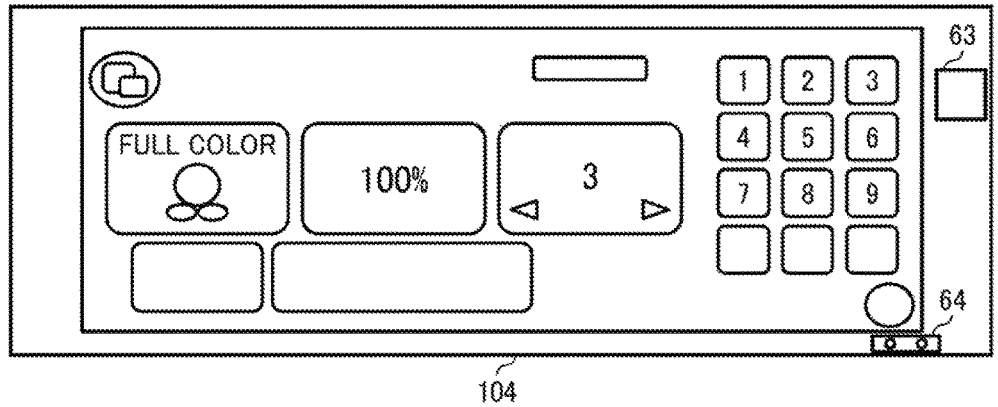
FIG. 7 illustrates an exemplary screen displayed on the operating part according to the present disclosure.

The mounting sensors 63 and/or 64, for example, as illustrated in FIGS. 5-7, may be deployed at two places on display panel 104 separated by a distance. Further, mounting sensors 63 and/or 64 may be deployed within or adjacent to recognition holes upon display panel 104. Recognition holes may be provided for attaching the hardware key 2 to display panel 104, and the mounting sensors may include a hole detection mechanism that detects the mounting a hole. For example, a pin 207 and/or 208 may be provided in the hardware key 2 for insertion into the recognition hole. In addition, the position of the pin 207 and/or 208 may vary depending on a kind of the hardware key 2, the combination of the hole of the mounting sensor and the pin 207 and/or 208, and the position may be determined in advance.

Hardware key 2 may further include an operating pan mounting guide 209. Operating part mounting guide 209 may be provided to enter the recognition hole. For example, the operating part mounting guide 209 is deployed so as to surround the periphery of the display panel 104 so that the pin 207 or 208 inserts into the recognition hole easily. In this way, by using the operating part mounting guide 209, misalignment and/or misconnection between the display panel and hardware key 2 may be reduced by preventing a bug that the pin 207 or 208 doesn't insert the recognition hole or a false insert.

The main controller 110 compares the positional information of the hardware key 2, i.e. where the hardware key 2 is positioned upon display panel 104, to the deploy information of the software keys, referred from the operating display controller 140. Based on the comparison between the positional information and the deploy information, the main controller 110 adjusts the output images displayed on the display panel 104. Main controller 110 further adjusts the output images based on what kind of the hardware key 2 is deployed.

It should be noted that the main controller 110 may refer to the data table stored in the HDD 40 based on the mounting presence or absence of the hardware key 2 and the type of the mounted hardware key 2. Further, main controller 110 may transmit the control information that changes the screen of the display and 104 to the operating display controller 140. An exemplary data table, as stored in HDD 40, is illustrated in FIG. 11.

The main controller 110 selects and/or adjusts the output of the display panel 104 based on the result of the comparison. At this time, in the display panel 104, the software keys are output according to the position of the hardware key 2 in accordance with the placement of the key top 201.

In this way, the controller 110 detects that the hardware key 2 is mounted on the display panel 104 by the mounting sensors 63 and/or 64, and an input part configures the software keys corresponding to the key placement of the hardware key 2. The operation at the display panel 104 is detected based on the placement of the software keys and the coordinate of the static electricity to be output from the hardware key 2. Further, main controller 110 is configured to control a display state of the display panel 104 based on a detection result of the mounting sensors 63 and/or 64. Main controller 110 controls the display panel 104 so that the display panel 104 outputs, or operates, in a first display mode when the hardware key 2 is not mounted onto display panel 104. Alternatively, main controller 110 controls the display panel 104 so that the display panel 104 outputs, or operates, in a second display mode when the hardware key 2 is mounted onto display panel 104.

FIGS. 5-7 illustrate exemplary screens output by the display panel in accordance with the present disclosure. In particular, FIGS. 5-7 illustrates exemplary screens displayed on display panel 104 when hardware key 2 is not mounted on no display panel 104. In FIGS. 5-7, display panel 104 outputs in the first display mode.

FIG. 5 illustrates a screen, displayed by display panel 1134, that includes the software keys which are assigned various functions that may be performed by information processing device 1. Each software key illustrated in FIG. 5 is of relative small display size. With such a configuration, user input into the operating part 70 is easy for function designation, but input error is likely because each key is of small size.

FIG. 6 shows is screen, displayed by display panel 104, that includes software keys which are assigned to basic functions such as copy and scan, which may be performed by the information processing device 1. Each of the software keys is of a relative large display size. With such a configuration, user input into the operating part 70 is convenient and input error is unlikely to occur because each key is of large size. However, with such a configuration, additional user input may be necessary for the performance of functions, which the information processing device 1 is capable of performing, that are not displayed on the screen.

FIG. 7 shows a screen, displayed by display panel 104, that includes software keys assigned to the basic functions installed in the information processing device 1, and a software key array such a 10-digit number pad assigned for the input of numbers. With such a configuration, input error may be reduced when compared to user input into the screen illustrated in FIG. 5. In the case of screen configuration shown in FIG. 7, the 10-digit number pad allows a user to select and/or input a print number of sheets, a print page number, etc., for executing a basic function performed by the information processing device 1. However, when the user inputs into the 10-digit number pad, the user may be required to confirm their input selection into the display panel 104.

FIGS. 5-7 illustrate screen outputs of display panel 104 when hardware key 2 is not mounted onto display panel 104. However, when mounting sensors 63 and/or 64 detect that hardware key 2 is mounted onto display panel 104, the output of display panel 104 is adjusted. Further, mounting sensors 63 and/or 64 detect the static electricity output from the hardware key 2, and which is then input into the software keys corresponding to the operation of the hardware key 2.

However, the mounting sensors 63 and/or 64 to not detect the mounting position of the hardware key 2 when the hardware key 2 is removed at a time when the display panel 104 is turned off or when the information processing device 1 is in an energy saving mode.

Figure 8A:
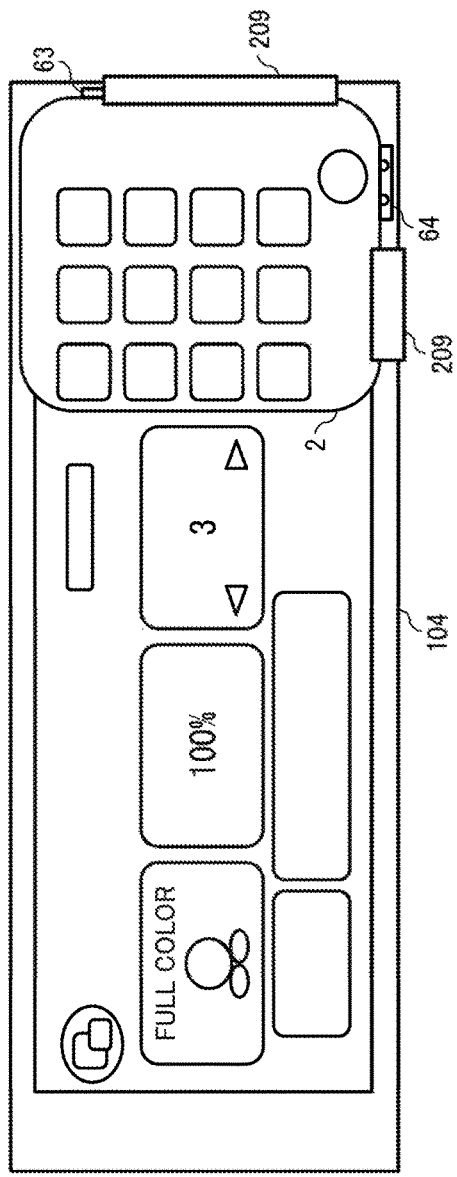
FIG. 8A illustrates an exemplary screen displayed on the operating part when the switching device is mounted on the information processing device in a portrait configuration according to the present disclosure.
Figure 8B:
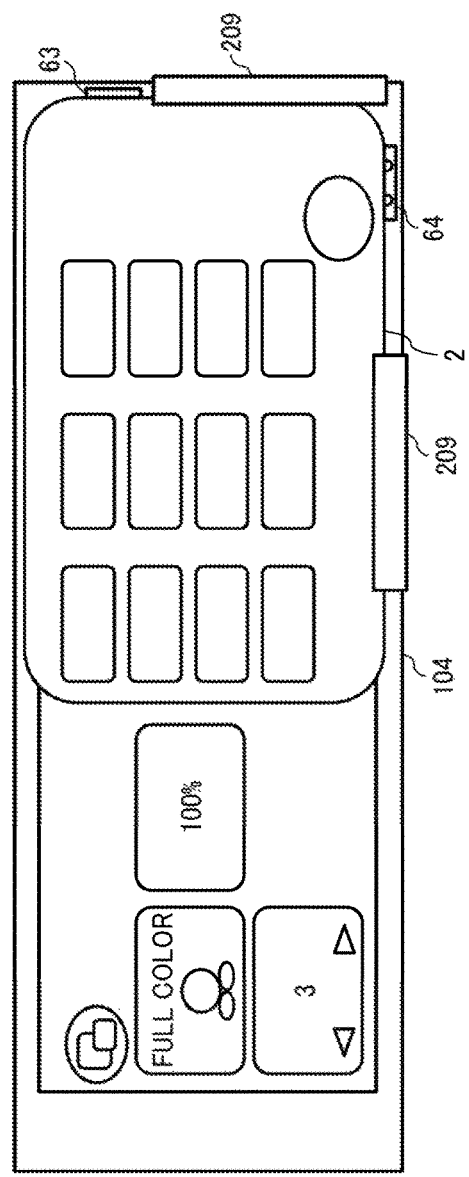
FIG. 8B illustrates an exemplary screen displayed on the operating part when the switching device is mounted on the information processing device in a landscape configuration according to the present disclosure.

FIGS. 8A and 8B illustrate screen outputs by display panel 104 when the hardware key 2 is mounted onto display panel 104. In particular, FIG. 8A illustrates a screen output by display panel 104 when the hardware key 2 is mounted in a portrait configuration on display panel 104, while FIG. 8B illustrates a screen output by display panel 104 when the hardware key 2 is mounted in a landscape configuration on display panel 104. In FIGS. 8A and 8B, display panel 104 outputs in the second display mode.

As illustrated in FIG. 8A, hardware key 2 is mounted in a portrait configuration upon display panel 104. Also, the hardware key 2 illustrated in FIG. 8A may be of a small type hardware key. As illustrated in FIG. 8B, hardware key 2 is mounted in a landscape configuration upon display panel 104, and the hardware key may be of a large type hardware key.

The hardware key 2 is detected by the mounting sensors 63 and/or 64. To detect hardware key 2, sensors 63 and/or 64 may detect and/or recognize the identifier of the hardware key 2. In some configurations, display panel 104 may output a mounting target position in which hardware key 2 is to be mounted upon display panel 104.

When the hardware key 2 is detected as mounted onto the display panel 104, the screen output by the display panel 104 is adjusted from a screen as illustrated in FIGS. 5-7 to a modified screen as illustrated in FIGS. 8A and 8B. In particular, positions of the software keys assigned to the basic functions installed in the information processing device 1 are adjusted so that the software keys are not overlapped or obstructed by the hardware key 2 mounted the display panel 104.

It should be noted that a size of the area of display panel 104 in which the software keys are displayed may vary depending on size, orientation and type of the hardware key 2 mounted on display panel 104. Therefore, a layout and/or configuration of the software keys to be displayed on the display panel 104 may be determined by referring to the data table shown in FIG. 11.

Figure 9:
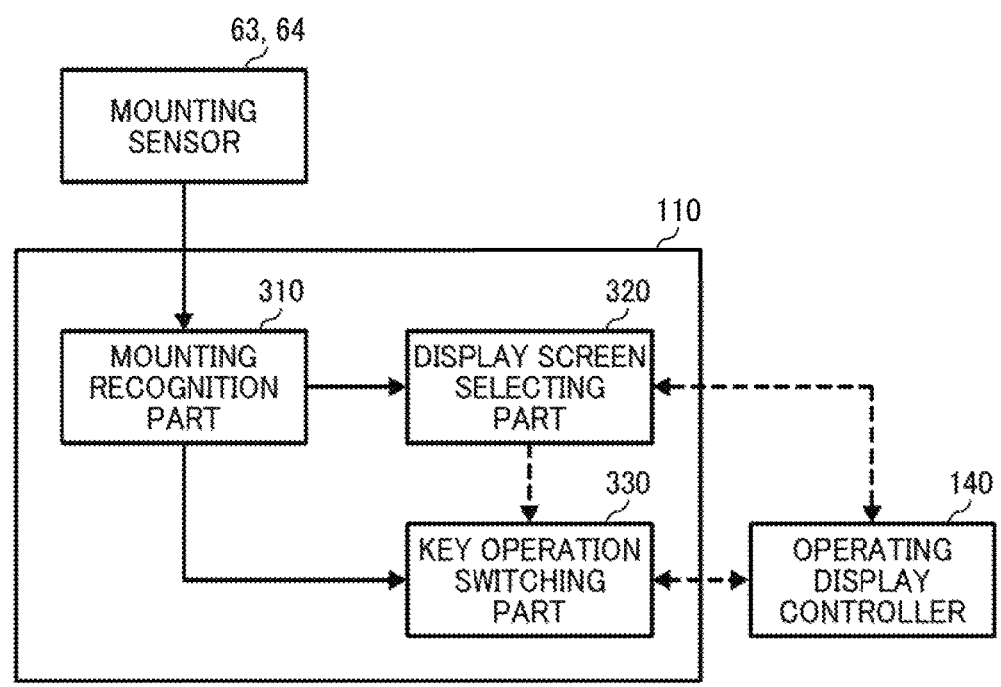
FIG. 9 illustrates a block diagram of a main section of the information processing device according to the present disclosure.

When hardware key 2 is mounted on display panel 104 as illustrated in FIGS. 8A and 8B, the display panel 104 detects static electricity generated by manipulating each key top of hardware key 2 at corresponding positions of software keys underneath the mounted hardware key 2. Further, specific software keys, which corresponding to specific functions of information processing device 1, may be assigned to a particular key top of hardware key 2. FIG. 9 illustrates a block diagram of a main section of the information processing device according to the present disclosure. As shown in FIG. 9, the main controller 110, which is executed by processing circuitry, includes a mounting recognition part 310, a display screen selecting part 320, and a key operation switching pan 330.

In an exemplary implementation, mounting recognition part 310 receives a detection result from mounting sensors 63 and/or 64. The detection result may be in the form of a mounting signal transmitted from mounting sensors 63 and/or 64 to mounting recognition part 310. The detection result may indicate whether hardware key 2 is mounted upon display panel 104. The detection result may further indicate an orientation of hardware key 2 or a placement error of hardware key 2 on display panel 104.

The mounting recognition part 310 determines that the hardware key 2 is mounted onto the display panel 104 when the mounting recognition part 310 receives the mounting signal of the hardware key 2, which may be output by the mounting sensor 63 and/or 64. In some embodiments, the mounting recognition part 310 may receive mounting signals from both sensors 63 and 64, and mounting recognition part 310 may detect the placement error between the mounted hardware key 2 and the software key displayed on the display panel 104 according to the mounting signals.

The placement error is an error in a position between the mounted hardware key 2 and the display panel 104. In other words, the placement error describes an error in an alignment, i.e. a misalignment, between the software keys on display panel 104 and the key tops 201 of hardware key 2. Based on the placement error, the data table shown in FIG. 11 may be generated, and a size and a placement adjustment of the software keys is determined.

In some implementations, the placement error between the mounted hardware key 2 and the position of the display panel 104 may be detected when the hardware key doesn't have the pin 207 and/or 208, and the pin 207 and/or 208 are not inserted into the hole of the mounting sensor 63 and/or 64. In such implementations, the mounting recognition part 310 detects the placement error based on the insertion, or lack thereof, of the pin 207 and/or 208 into the hole of mounting sensor 63 and/or 64.

A placement error, determined by mounting recognition part 310, may be transmitted to the display screen selecting part 320 and the key operation switching part 330 as a placement error information. And therefore, the mounting recognition part 310 acts as a detection part that detects mounting of the hardware key 2 onto the display panel 104 based a detection result of mounting sensors 63 and/or 64.

The display screen selecting part 320 decides, based on the placement error information, a type and direction information, which indicates a mounted direction of the hardware key 2. In other words, display screen selecting pen 320 determines whether the hardware key 2 is in a portrait or landscape orientation. Further, the display screen selecting part 320 selects the screen to be displayed by display panel 104 based on the decision, and transmits a command to operating display controller 140, which controls display panel 104 to display the selected screen. The direction information is transmitted by display screen selecting part 320 to the key operation switching part 330.

The key operation switching part 330 decides the placement and the coordinate of the software keys based on the placement error information, the type of information, and the direction information. In addition, the key operation switching part 330 decides the placement and coordinates of the software keys as an operation corresponding to the placement of the hardware key 2 upon the touchscreen. The key operation switching part 330 transmits the decided placement to the operating display controller 140, and the operating display controller 140 executes a control placement of the software keys to the decided placement and coordinates. As a result, the processing circuitry, which operates the display screen selecting part 320 and the key operation switching part 330, act as a display control part that control the display state of the display panel 104.

Figure 10:
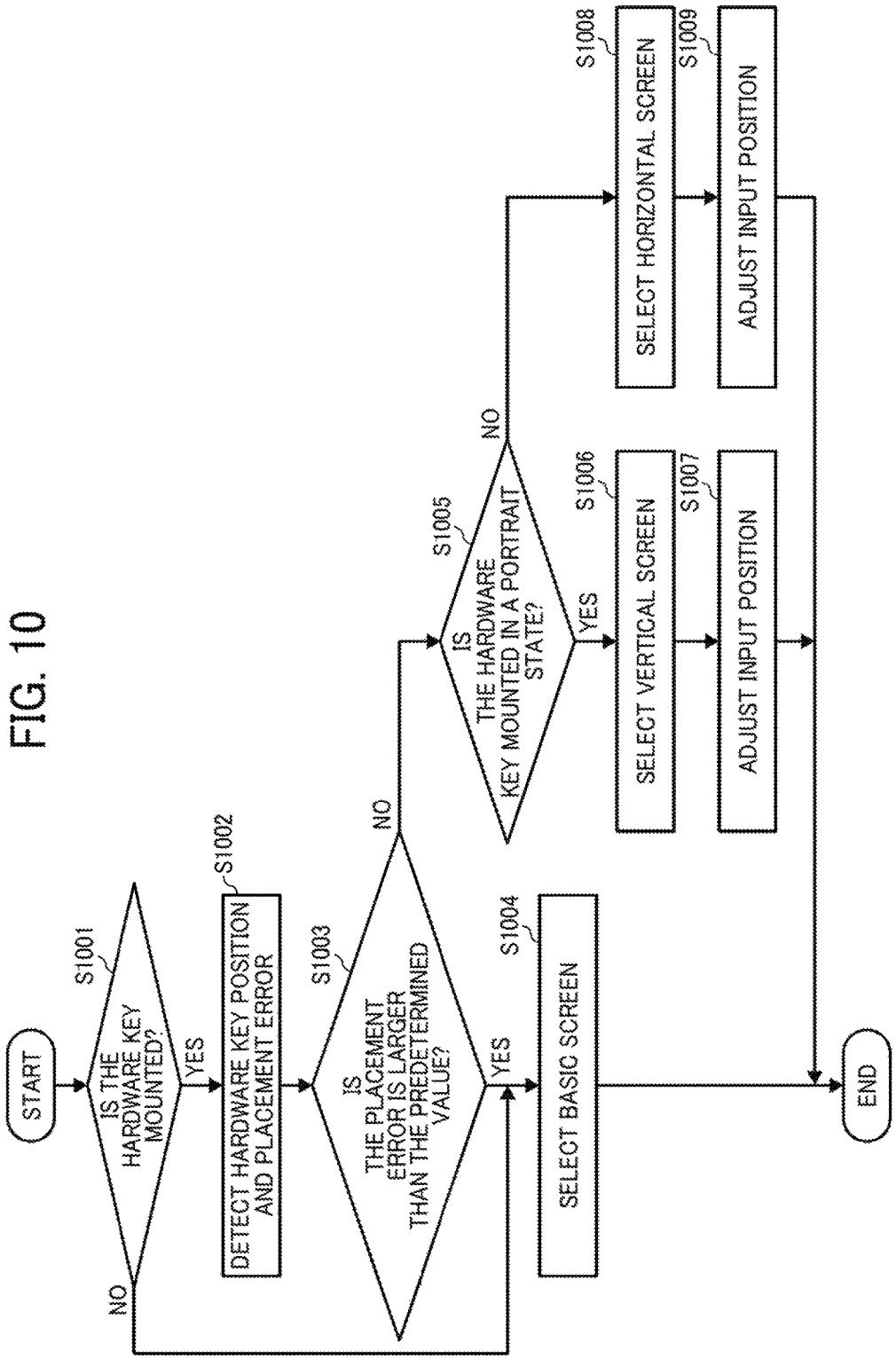
FIG. 10 illustrates a flowchart of a key input operation according to the present disclosure.

FIG. 10 illustrates a flowchart of an input operation from hardware key 2 to display panel 104. In step S1001, the operating display controller 140 determines whether the hardware key 2 is mounted upon display panel 104 according to a detection result of mounting sensors 63 and/or 64. If operating display controller 140 determines that hardware key 2 is not mounted on display panel 104, then the display panel 104 is controlled to output in the first display mode and the process proceeds to step S1004. If operating display controller 140 determines that hardware key 2 is mounted on display panel 104, then the display panel 104 is controlled to output in the second display mode and the process proceeds to step S1002.

When the hardware key 2 is determined to be mounted on the display panel 104 (Step S1001/Yes), the mounting recognition art 310 detects a mounting signal output from the mounting sensors 63 and/or 64 (Step S1002). The mounting recognition part 310 detects a placement error between the mounting position of the hardware key 2 and the software key displayed on the display panel 104, based on the mounting signal output from the mounting sensors 63 and/or 64. The placement error detected at this time is transmitted to the display screen selecting part 320 and the key operation switching part 330.

In step S1003, the display screen selecting part 320 compares whether the placement error to a predetermined threshold value. If display screen selecting part 320 determines that the placement error is larger than or exceeds the predetermined threshold value, i.e. the mounting recognition part 310 cannot detect the static electricity to be output from the hardware key 2, the display screen selecting part 320 transmits the information to be display the basic screen on the display panel 104 to the operating display controller 140 and the process proceeds to step S1004. It should be noted that when the placement error is larger than or the predetermined threshold value, the pins 207 and 208 are not inserted into the hole of the mounting sensors and/or the mounting sensors are both in a non-detection state (OFF state). That is, when the placement error is larger than or the predetermined threshold value, the mounting state is considered to be the same as if the hardware key 2 is not mounted onto the display panel 104.

On the other hand, if the display screen selecting part 320 determines that the placement error is not larger than or does not exceed the predetermined threshold value, then the process proceeds to step S1005.

In step S1004, the operating display controller 140 receives the information to display the basic screen, and display panel 104 is controlled to output in the first display mode, displaying the basic screen on the display panel 104. It should be noted that, when the operating display controller 140 received the information to display the basic screen, the mounting recognition part 310 may detect a subsequent mounting of hardware key 2 at a mounting location by the mounting sensor 63 and/or 64.

In step S1005, the mounting recognition part 310 detects whether the hardware key 2 is mounted to the display panel 104 in a portrait orientation based on the measured placement error. When mounting recognition part 310 determines that the hardware key 2 is mounted in the portrait orientation, the display screen selecting part 1320 transmits the information to the operating display controller 140 and the key operation switching part 330. In step S1006, the operating display controller 140 receives the information and controls the display panel 104 to output in the second display mode, displaying the screen in a configuration where the hardware key 2 is in a vertical, portrait orientation, in step S1007, the key operation switching part 330 adjusts the placement and the coordinate of the software keys to be operated in the portrait orientation corresponding to the hardware key 2.

It should be noted that, in a portrait orientation, the pin 207 may be inserted into a hole of one of the mounting sensors 63/64 and is in a detection state (ON state), while the pin 208 is inserted in a hole of the other one of the mounting sensors 63/64 and is in a non-detection state (OFF state). Also, the position and the placement of the software keys displayed on the display panel 104 are displayed so as correspond to the vertical screen support identified in the data table of FIG. 11.

In step S1005, if the mounting recognition part 310 detects that the hardware key 2 is not mounted to the display panel 104 in the vertical state, i.e. the hardware key 2 is mounted in a landscape/horizontal state. As previously described, mounting recognition part 310 makes the determination based on the placement error. When determining that the hardware key 2 is in a landscape state, the display screen selecting part 320 transmits the information to the operating display controller 140 and the key operation switching part 330 and the process proceeds to step S1008. In step S1008, the operating display controller 140 receives the information and controls display panel 104 to output in the second display mode, displaying the screen in a configuration where the hardware key 2 is in the landscape/horizontal orientation. In step S1009, the key operation switching part 330 adjusts the placement and the coordinate of the software keys to be operated in the landscape state corresponding to the hardware key 2.

It should be noted that, in the landscape orientation, the pin 207 is inserted into a hole of one of the mounting sensors 63/64 and is in a non-detection state (OFF state), while the pin 208 is inserted in a hole of the other one of the mounting sensors 63/64 and is in a detection state (ON state). Also, the position and the placement of the software keys displayed on the display panel 104 are displayed so as to correspond to the horizontal screen support identified in the data table of FIG. 11.

As described above, when the hardware key 2 is mounted upon the display panel 104, the information processing device 1 detects the static electricity generated by operating the keys of the respective constituting the hardware key 2. After that, the display panel 104 executes inputting functions assigned at the each software key and numbers by changing display of the software keys located on the display panel 104. And therefore, in the information processing device 1 according to the embodiment, by using the hardware key 2 and the display panel 104 of the touch panel type simultaneously, it is possible to perform an operation input of a physical repulsion from the hardware key 2. With such a configuration, the user of the information processing device 1 easily recognizes that the operation corresponding to the function of the hardware key 2 in the display panel 104 is performed.

Other implementations are considered and do not depart from the scope of the present disclosure. For example, if the hardware key 2 does not include a battery 205, electric power from the information processing device 1 may be supplied to the hardware key 2 via wired or wireless conveyance.

In the present disclosure, the information processing device 1 may detect an operation on the operating part 70 via pressure applied to the display panel 104, for example, and a resistive film upon information processing device 1 of the formula or a surface acoustic wave equation can be applied the technology of the present disclosure. Further, in case of applying the technique of the present disclosure in the information processing device 1 such this input method, the hardware key 2 that has the configuration as to depress the operating part 70 by mechanical changes that occur in response to depression of the key top 201 it is preferable to use the hardware key 2.

The above descriptions the information processing device, switching device and method are just examples, and various modifications, replacements, or combinations can be made without departing from the scope of the present disclosure by persons skilled in the art.

What is claimed is:

1. An information processing device, comprising:
   a touchscreen display configured to
      output images and software keys, and
      detect a touch input to the touchscreen display;
   a sensor configured to
      detect whether a switching device is mounted on the touchscreen display, and
      detect a placement error of the switching device on the touchscreen display, the placement error indicating an amount of misalignment between the switching device and the software keys; and
   processing circuitry configured to
      determine whether the placement error exceeds a predetermined threshold,
      control the touchscreen display to output the images in a first area of the touchscreen display when the sensor detects that the switching device is not mounted on the touchscreen display or when the placement error exceeds the predetermined threshold, and
      control the touchscreen display to output the images in a second area of the touchscreen display when the switching device is mounted on the touchscreen display and the placement error is below the predetermined threshold, wherein
   the second area is smaller than the first area, and
   the second area is adjacent to a portion of the touchscreen display on which the switching device is mounted.

2. The information processing device according to claim 1, wherein
   the switching device includes an identifier, and
   the sensor detects whether the switching device is mounted on the touchscreen display when the sensor recognizes the identifier.

3. The information processing device according to claim 1, wherein
   the switching device includes an identifier,
   the sensor is further configured to detect an orientation of the switching device, based on a position of the identifier, when the sensor detects that the switching device is mounted on the touchscreen display, and
   the processing circuitry is further configured to
      recognize the orientation of the switching device based on the orientation detected by the sensor, and
      format the images for output according to the orientation of the switching device.

4. The information processing device according to claim 1, wherein the processing circuitry controls the touchscreen display to output an indication that indicates the placement error.

5. The information processing device according to claim 1, wherein
   the switching device outputs an electrostatic charge to the touchscreen display in response to each depression of a plurality of switches of the switching device, and
   the touchscreen display detects the electrostatic charge, output by the switching device, as the touch input.

6. The information processing device according to claim 1, wherein
   the switching device outputs a mechanical force to the touchscreen in response to each depression of a plurality of switches of the switching device, and
   the touchscreen detects the mechanical force, output by the switching device, as the touch input.

7. The information processing device according to claim 3, wherein when the touchscreen display outputs the images in the second area, the processing circuitry configures the second area to be larger when the switching device is mounted in a portrait orientation than when the switching device is mounted in a landscape orientation.

8. The information processing device according to claim 1, wherein the processing circuitry adjusts a size of the second area according to a size of the switching device.

9. The information processing device according to claim 1, wherein
   the switching device includes a pin, and
   the sensor detects whether the switching device is mounted on the touchscreen display and detects the placement error of the switching device according to whether the pin is inserted into a recognition hole of the sensor.

10. A switching device, comprising:
    a plurality of mechanically depressible switches; and
    a pin configured for mounting the switching device onto a touchscreen display of an information processing device, wherein
    the switching device outputs a detectable change to the touchscreen display in response to depression of a mechanically depressible switch of the plurality of mechanically depressible switches, the touchscreen display determines determine whether a placement error exceeds a predetermined threshold, the placement error indicating an amount of misalignment between the switching device and software keys output by the touchscreen display, the touchscreen display outputs the images in a first area of the touchscreen display when the switching device is not mounted on the touchscreen display or when the placement error exceeds the predetermined threshold, the touchscreen display outputs the images in a second area of the touchscreen display when the switching device is mounted on the touchscreen display and the placement error is below the predetermined threshold, the second area is smaller than the first area, and the second area is adjacent to a portion of the touchscreen display on which the switching device is mounted.

11. The switching device according to claim 10, wherein the switching device outputs an electrostatic charge to the touchscreen display in response to depression of any mechanically depressible switch of the plurality of mechanically depressible switches.

12. The switching device according to claim 10, wherein the switching device outputs a mechanical force to the touchscreen display in response to depression of any mechanically depressible switch of the plurality of mechanically depressible switches.

13. A method, comprising:
outputting, by a touchscreen display of an information processing device, images and software keys;
detecting, by a sensor of the information processing device, whether a switching device is mounted onto the touchscreen display;
detecting, by the sensor when the switching device is mounted onto the touchscreen display, a placement error of the switching device, the placement error indicating an amount of misalignment between the switching device and the software keys;
determining, by processing circuitry of the information processing device, whether the placement error exceeds a predetermined threshold;
controlling, by the processing circuitry when the switching device is not mounted on the touchscreen display or when the placement error exceeds the predetermined threshold, the touchscreen display to output the images in a first area of the touchscreen display; and
controlling, by the processing circuitry when the switching device is mounted on the touchscreen display and the placement error is below the predetermined threshold, the touchscreen display to output the images in a second area of the touchscreen display, wherein
the second area is smaller than the first area, and
the second area is adjacent to a portion of the touchscreen display on which the switching device is mounted.

14. The method according to claim 13, wherein
the switching device includes an identifier, and
the method further comprises detecting, by the sensor, that the switching device is mounted on the touchscreen display when the sensor recognizes the identifier.

15. The method according to claim 13, wherein
the switching device outputs an electrostatic charge to the touchscreen display in response to each depression of a plurality of switches of the switching device, and
the method further comprises detecting the electrostatic charge output by the switching device.

16. The method according to claim 13, wherein
the switching device outputs a mechanical force to the touchscreen display in response to each depression of a plurality of switches of the switching device, and
the method further comprises detecting the mechanical force output by the switching device.

17. The method according to claim 13, further comprising adjusting a size of the second area according to a size of the switching device.

18. The method according to claim 13, wherein
the switching device includes a pin, and
the sensor detects whether the switching device is mounted on the touchscreen display and the placement error of the switching device according to whether the pin is inserted into a recognition hole of the sensor.

* * * * *